US008412561B2

(12) United States Patent
Sathyan et al.

(10) Patent No.: US 8,412,561 B2
(45) Date of Patent: Apr. 2, 2013

(54) BUSINESS CASE EVALUATION SYSTEM AND METHODS THEREOF

(75) Inventors: Jithesh Sathyan, Kollam (IN); Naveen Krishnan Unni, Bangalore (IN); Anil J. Rajan, Trivandrum (IN)

(73) Assignee: Infosys Technologies, Ltd., Bangalore (IN)

( * ) Notice: Subject to any disclaimer, the term of this patent is extended or adjusted under 35 U.S.C. 154(b) by 1021 days.

(21) Appl. No.: 11/878,960

(22) Filed: Jul. 30, 2007

(65) Prior Publication Data

US 2008/0040145 A1    Feb. 14, 2008

(30) Foreign Application Priority Data

Aug. 9, 2006  (IN) .......................... 1424/CHE/2006

(51) Int. Cl.
*G06Q 10/00*  (2006.01)
(52) U.S. Cl. ..................................... 705/7.36; 705/7.28
(58) Field of Classification Search ................. 705/7.36, 705/7.28
See application file for complete search history.

(56) References Cited

U.S. PATENT DOCUMENTS

| | | | |
|---|---|---|---|
| 4,835,372 A | 5/1989 | Gombrich et al. | |
| 5,734,837 A | 3/1998 | Flores et al. | |
| 5,774,661 A | 6/1998 | Chatterjee et al. | |
| 5,826,239 A | 10/1998 | Du et al. | |
| 5,937,388 A | 8/1999 | Davis et al. | |
| 6,125,390 A | 9/2000 | Touboul | |
| 6,393,290 B1 * | 5/2002 | Ufongene | 455/446 |
| 6,473,794 B1 | 10/2002 | Guheen et al. | |
| 6,714,976 B1 | 3/2004 | Wilson et al. | |
| 6,988,088 B1 | 1/2006 | Miikkulainen et al. | |
| 7,328,261 B2 | 2/2008 | Husain et al. | |
| 7,364,067 B2 | 4/2008 | Steusloff et al. | |
| 7,509,343 B1 | 3/2009 | Washburn et al. | |
| 7,587,715 B1 | 9/2009 | Barrett et al. | |
| 7,613,804 B2 | 11/2009 | Raden et al. | |
| 7,707,133 B2 | 4/2010 | Das et al. | |
| 2002/0055849 A1 | 5/2002 | Georgakopoulos et al. | |
| 2002/0059456 A1 * | 5/2002 | Ha et al. | 709/246 |
| 2002/0078174 A1 | 6/2002 | Sim et al. | |
| 2002/0133491 A1 | 9/2002 | Sim et al. | |
| 2003/0229890 A1 | 12/2003 | Lau et al. | |
| 2004/0205182 A1 | 10/2004 | Geddes | |
| 2005/0010880 A1 * | 1/2005 | Schubert et al. | 716/4 |
| 2005/0060224 A1 * | 3/2005 | Ricketts | 705/11 |

(Continued)

OTHER PUBLICATIONS http://www.scientificamerican.com/article.cfm?id=turn-fluorescent-lights-off-when-you-leave-room p. 1-3, dated Mar. 2008, accessed Sep. 25, 2012.*

*Primary Examiner* — Andre Boyce
*Assistant Examiner* — Adrian McPhillip
(74) *Attorney, Agent, or Firm* — LeClairRyan, a Professional Corporation

(57) ABSTRACT

A system and method to offer a one or more experiences using various layers to at least one customer is disclosed. The method includes user experience layer having a first plurality of components owned by at least one service provider to evaluate a plurality of experimental changes of the at least one customer. The method further includes user service layer having a second plurality of components owned by the at least one service provider to offer a first plurality of services for the at least one customer. The method further includes an adaptation layer, a network service layer, a protocol layer and a platform layer having one or more components to provide one or more functionalities. Additionally, the method further includes a monitoring and control layer with one or more components to build management information across the one or more layers.

14 Claims, 2 Drawing Sheets

U.S. PATENT DOCUMENTS

| | | |
|---|---|---|
| 2005/0091269 A1 | 4/2005 | Gerber et al. |
| 2005/0278202 A1* | 12/2005 | Broomhall et al. ............... 705/7 |
| 2006/0004767 A1 | 1/2006 | Diaconu et al. |
| 2006/0067252 A1 | 3/2006 | John et al. |
| 2006/0112375 A1 | 5/2006 | Schneider |
| 2006/0287890 A1 | 12/2006 | Stead et al. |
| 2007/0168225 A1 | 7/2007 | Haider et al. |
| 2007/0282659 A1 | 12/2007 | Bailey et al. |

* cited by examiner

BUSINESS CASE EVALUATION SYSTEM AND METHODS THEREOF

CROSS REFERENCE TO RELATED DOCUMENTS

This application claims priority under 35 U.S.C. §119 to Indian Patent Application Serial No. 1424/CHE/2006 of SATHYAN et al., entitled "BUSINESS CASE EVALUATION SYSTEM AND METHODS THEREOF," filed Aug. 9, 2006, the entire disclosure of which is hereby incorporated by reference herein.

BACKGROUND OF THE INVENTION

1. Field of the Invention

The present technique relates generally to an architecture reference model for wireless network designs. In particular, the present technique may be the evaluation of the service space and the network space as one full flow that may be required to bring out business-focused technology development.

2. Discussion of the Background

Network design reference models such as I-centric and WWRF/WSI have "service-deployers" as a point of focus that enables them to evaluate market penetration as well as other user-related capabilities of applications or services. However, the said reference models do not focus on the evaluation of an end to end flow from services to network capabilities. Furthermore, the said reference models evaluation techniques may have been able to satisfy past requirements primarily due clearly defined roles like network providers providing network elements, service providers determine the services offered, integrators determine the implementation of service to network, etc.

Moreover, as and when the "service deployers" have the network capability to enable particular application functionality, the right products may not be readily available. Furthermore, the network developers make development in their network, without having an end to end view available, resulting in products with sub-optimal market fit. As a result, profitability of the network developers as well as rapid service development may be affected.

Accordingly, there is a need for a technique that evaluates user space and network space as one full flow that may be required to bring out business focused technology development. However, converged networks may be set to change dramatically with a multitude of service providers, content providers, network providers and equipment providers having to rapidly conceptualize, evaluate and integrate their service offerings. Furthermore, due to increasing competition, there may be additional pressure to deliver the right product or service on time and every time.

SUMMARY OF THE INVENTION

The above and other needs are addressed by the present invention which provides, for example, a method and system for modeling and designing a network functionality, and a tangible computer-readable medium having stored thereon computer executable instructions for modeling and designing a network functionality.

In one embodiment of the present technique, a method for modeling and designing a network functionality is disclosed. The method identifies a design module to provide a plurality of features to validate an end to end business case. The method further identifies a current layer in a chromatographic model, wherein the design module fits in a set of preceding layers or in a set of succeeding layers or combination thereof. The method further includes determining the set of preceding layers and the set of succeeding layers using the current layer. The method continues identifying a set of components in the set of preceding layers and the set of succeeding layers. The method continues extracting a first set of inputs for the end to end business case to identify value of the set of components in the set of preceding layers. Furthermore, the method continues extracting a second set of inputs for the end to end business case to identify cost of the set of components in the set of succeeding layers and the method extracts a third set of inputs for the end to end business case to identify cost and value of the set of components in the current layer. The method further includes evaluating the end to end business case for accepting or rejecting the design module.

In another embodiment of the present technique, a system for modeling and designing a network functionality is disclosed. The system includes a design module adapted to identify and provide a plurality of features to validate an end to end business case. The system further includes a set of components adapted to be identified in a set of preceding layers and a set of succeeding layers. The system further includes a first set of inputs adapted to be extracted for an end to end business case to identify value of the set of components in the set of preceding layers. The system includes a second set of inputs adapted to be extracted for the end to end business case to identify cost of the set of components in the set of succeeding layers. Furthermore, the system includes a third set of inputs adapted to be extracted for the end to end business case to identify cost and value of the set of components in the current layer.

In yet another embodiment of the present technique, a tangible computer-readable medium having stored thereon computer executable instructions for modeling and designing a network functionality is disclosed. The computer-readable medium includes a program code adapted for identifying a design module to provide a plurality of features to validate an end to end business case. The computer-readable medium further includes a program code adapted for identifying a current layer in a chromatographic model, wherein the design module fits in a set of preceding layers or in a set of succeeding layers or combination thereof. The computer-readable medium further includes a program code adapted for determining the set of preceding layers and the set of succeeding layers using the current layer. The computer-readable medium further includes a program code adapted for identifying a set of components in the set of preceding layers and the set of succeeding layers. The computer-readable medium further includes a program code adapted for extracting a first set of inputs for the end to end business case to identify value of the set of components in the set of preceding layers. The computer-readable medium further includes a program code adapted for extracting a second set of inputs for the end to end business case to identify cost of the set of components in the set of succeeding layers. The computer-readable medium further includes a program code adapted for extracting a third set of inputs for the end to end business case to identify cost and value of the set of components in the current layer. Furthermore, the computer-readable medium further includes a program code adapted for evaluating the end to end business case for accepting or rejecting the design module.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

Figure 1:
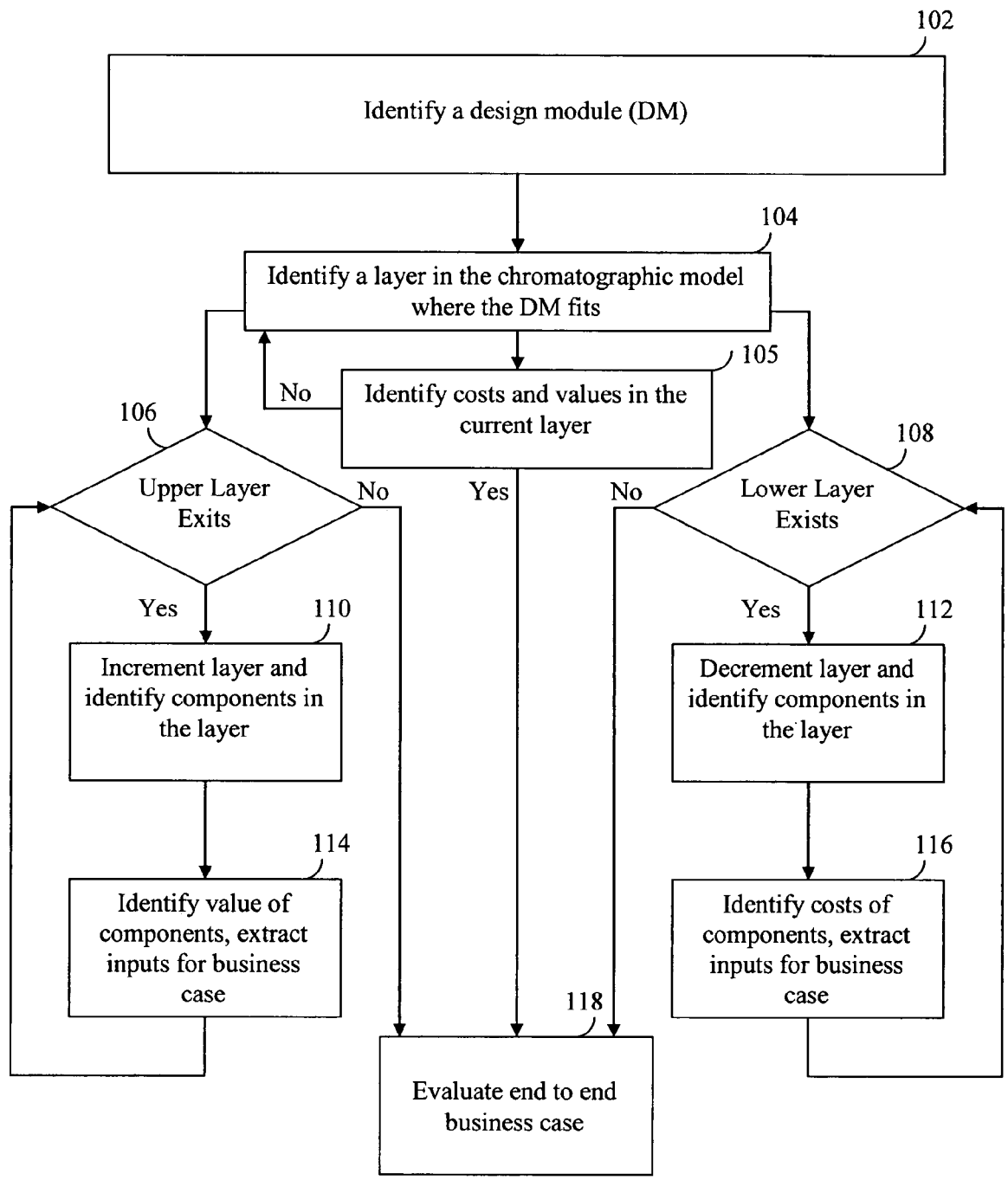
FIG. 1 is a flow diagram illustrating a design process indicative for modeling and designing a network functionality, in accordance with an aspect of the present technique.
Figure 2:
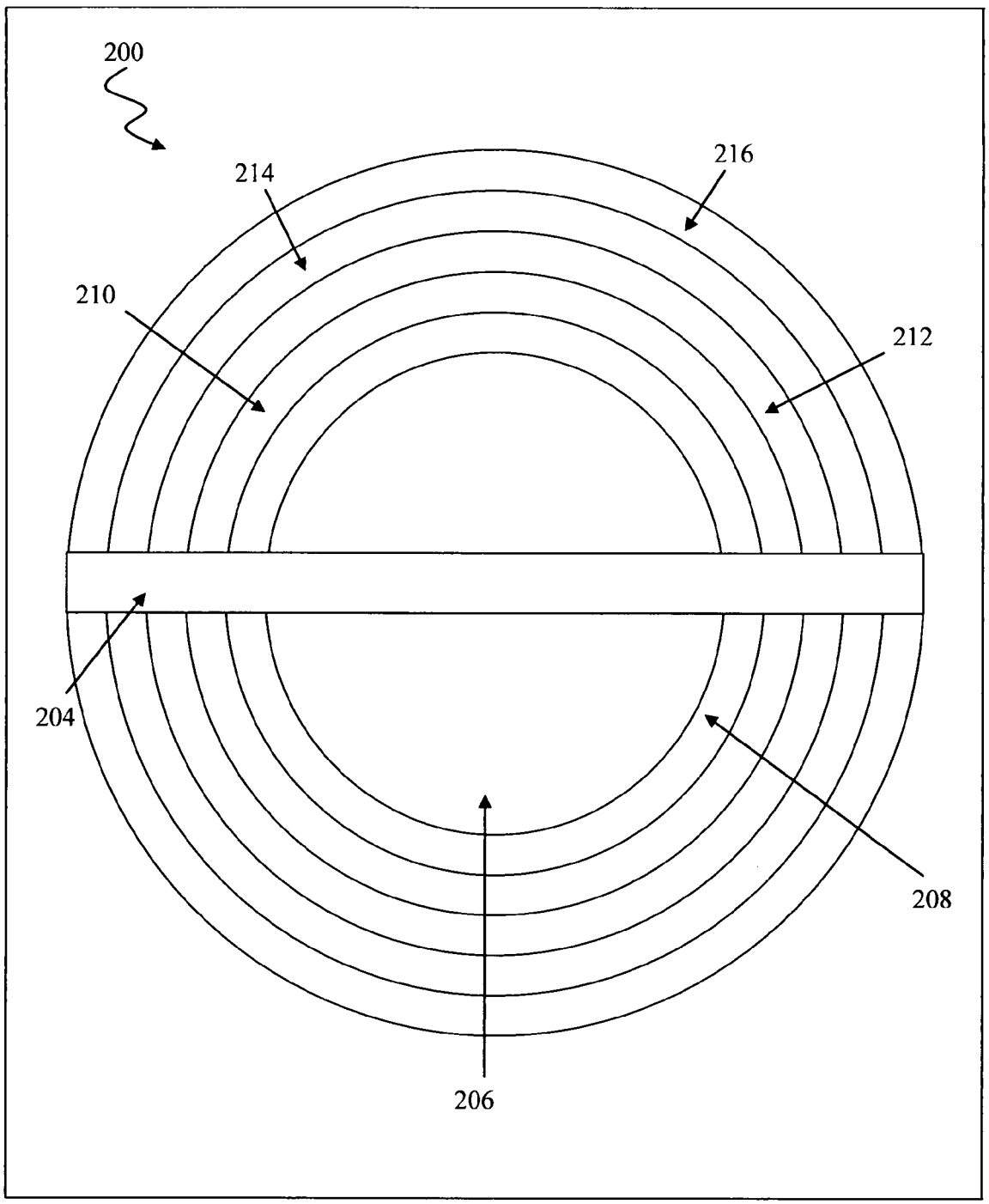
FIG. 2 is a schematic diagram illustrating an architecture consisting of multiple layers that are involved in offering one or more experiences to an end user or a customer.

Referring now to the drawings, wherein like reference numerals designate identical or corresponding parts throughout the several views, and more particularly to FIGS. 1-2 thereof, which will be used to illustrate a method and system for modeling and designing a network functionality, according to exemplary embodiments of the present invention.

The following description is full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings and the appended claims. While the system and method described herein are provided with a certain degree of specificity, the present technique may be implemented with either greater or lesser specificity, depending on the needs of the user. Further, some of the features of the present technique may be used to advantage without the corresponding use of other features described in the following paragraphs. As such, the present description should be considered as merely illustrative of the principles of the present technique and not in limitation thereof, since the present technique is defined solely by the claims.

The present invention relates to an architecture reference model for wireless network designs. In particular, the present technique may be the evaluation of the service space and the network space as one full flow that may be required to bring out business-focused technology development.

FIG. 1 is a flow diagram illustrating a design process indicative for modeling and designing a network functionality, in accordance with an aspect of the present technique.

As will be appreciated by people skilled in the art, to best understand the present invention it is important to be familiar with the environment in which it is used and the basic terminologies. The design process is a series of steps followed by designers, architects and some system designers. The typical stages of the design process includes design brief (a statement of the task at hand), analysis (analysis of the current system), research (investigating similar products in the field or related topics), specification (detailed definitions of what exactly the product must do), design (presentation of solutions), development (continuation and improvement of one solution), testing (testing of the system), implementation (introducing the design into the environment), evaluation (evaluation of process) and conclusion (summary of process and future suggestions). Modeling may be an abstract representation of an object or system from a particular viewpoint. Designing may be a process of originating and developing a plan for a new object. Moreover, designing normally requires considering aesthetic, functional, and many other aspects of an object, which usually requires considerable research, thought, modeling, iterative adjustment, and re-design. The network functionality may be a characteristic that causes a good or service to have a value to potential customer dependent on the number of customers already owning that good or using that service.

The method starts at step 102, wherein the design module may be identified. The method continues at step 104, wherein the layer in the chromatographic (chromatography is used to determine the identity and concentration of components in a particular layer) model where the design module may be suitably fit. By way of example, in this case, the model may be such as a network service or a platform enhancement. The method continues at step 105, wherein the cost and values of the business case may be identified in the current layer. It should be noted that when step 105, may be true the method at step 118 may be executed else when the step 105 may be false, the method at step 104 may be repeated. The method continues at step 106, wherein the presence of the preceding layers may be determined. The method continues at step 108, wherein the presence of the succeeding layers may be determined. It is to be observed that when the step 106 is true the method continues with the step 110 and when the step 106 is false the method continues with the step 118. It is also to be observed that when the step 108 is true the method continues with the step 112 and when the step 108 is false the method continues with the step 118. The method continues at step 110, wherein the layers are incremented and may be the preceding layers for the current layer. The method continues at step 112, wherein the layers are decremented and may be the succeeding layers for the current layer. In these cases, the impact of the design module may be identified and the components required for implementation in each layer may be identified.

Furthermore, the method continues at step 114, wherein the value of the components may be identified for each layer. It is to be noted that at each layer inputs may be received that needs to be plugged into the end to end business case evaluation. The method continues at step 116, wherein the value of the components may be identified for each layer. It is to be noted that at each layer inputs may be received that needs to be plugged into the end to end business case evaluation. The method continues at step 118, the end to end business case may be evaluated. It should be noted that the spreading impact of the design module may be similar to the process of chromatography. Chromatography is a concept where the components filter themselves as they spread. In addition, the design module may be anything from a generic service such as control of home appliances using wireless network or a protocol to support a new service in the wireless environments.

By way of examples, the below section depicts specific use cases for the chromatographic design process. In addition, the below section details the two use cases related to the wireless design concepts and also explains the process of using the chromatographic model to validate the case for the design concept. The below mentioned both cases explain the values added to the preceding layers and requirements in the succeeding layers which can be used to validate the end to end business case and then reject or accept the concept.

The first design module that may be mentioned may be a wireless video conferencing service. The features of the design module may be such as seamless video conferencing across mobile phones, personal computers (PCs) and specialized video conferencing (VC) equipment. In this case, customizable presentation layer based on device handling the service may be utilized. In addition, capability to chat with other users, as well as to share a common whiteboard.

In one embodiment, to depict on functional description, wireless video conferencing service (WVCS) may be a component in the user service layer (explained below). In another embodiment, in addition, using the design process the value (benefits) of the component in the user experienced layer (explained below) may be identified. To be clear of the sample components that may be identified such as personal face to face communication, remote education opportunities, remote medical assistance, cost effective business discussions or visual entertainment. Each of the said need may be evaluated individually to derive inputs for the end to end business case.

In another embodiment, the requirements (costs) from the succeeding layers for implementing the said component may be identified. In another embodiment, at the adaptation layer (explained below), a mediation component for translating present data based on the user device and the network may be needed. In another embodiment, in the network service layer (explained below) components such as video or audio compression, internet protocol (IP) streaming and presence services may be required. In another embodiment, in the protocol or interoperability layer, components such as cluster capability and H.323 protocol support may be required.

In yet another embodiment, in the platform layer, components such as high availability, real-time, fault-tolerant, scalable multi-card architecture may be required. In addition, once the said components may be defined, inputs on the costs associated may be extracted and fed into the end to end business case evaluation.

Furthermore, the second design concept that may be mentioned below may be a low level network service enhancement. The features may be current wireless protocols (MAP) does not support delivery of the calling name (CN) as signaling information to the mobile. In addition, the design concept may be to modify existing MAP/SS7 to add the CN to the signaling data transmitted to the mobile. The term mobile application part (MAP) may be defined as a global system for mobile communications (GSM) protocol to provide an application layer for the various nodes in the core mobile network to communicate with each other in order to provide services to mobile phone users.

To depict on the functional description, in one embodiment, in the network service layer may be the wireless calling name (WCNAM) component maybe required. In another embodiment, in the adaptation layer there may be no values. In addition, a cost input may be considered for requirements. In another embodiment, in the user service layer, components such as named based call barring, named based ring tones may be required. In another embodiment, in the user experience layer, components such as enhanced security against prank calls, quicker recognition of caller may be required. In another embodiment, at the lower layers, in the protocol layer, components such as update MAP/CAMEL specs, enable LIDB functionality, backward compatibility to earlier MAP/CAMEL specs may be required. In yet another embodiment, in the platform layer, there may be no additional component for a change may be identified for the requirements. In this case, a similar exercise of input collation may be done from the said components and fed into the end to end business case evaluation. The term customized applications for mobile networks enhanced logic (CAMEL) may be defined as a set of GSM standards designed to work on a GSM core network. These standards allow an operator to define services over and above standard GSM services. The CAMEL architecture is based on intelligent network (IN) standards, and uses the CAP protocol.

FIG. 2 is a schematic diagram 200 illustrating an architecture consisting of multiple layers that are involved in offering one or more experiences to an end user or a customer. The schematic diagram 200 consists of one or more layers built as preceding layers and succeeding layers. The preceding layers and the succeeding layers comprise a user experience layer 216, a user service layer 214, an adaptation layer 212, a network service layer 210, a protocol layer 208, a platform layer 206 and a monitor and control layer 204. It should be noted that based on the identified current layers the above one or more layers of the current layer may be the preceding layers and the below one or more layers of the current layer may be the succeeding layers. The said layers may be explained in detail in the following sections. It should be noted that, for any experience to be delivered to a user, one or more components in each layer may be involved. In addition, there may also be components in different layers such as "owned" or controlled by disparate stakeholders. By way of example, the user service layer components may typically be controlled by the service provider. This integration of various stakeholder components may be a key element of the model. The first set of components may be the components that may be controlled by the service providers. The second set of components may be the components that may be controlled by the network providers. The third set of components may be the components the integrated components of various stakeholders or customers.

Furthermore, the said layers may be segregated into first type user centric such as user experience and user service layers. In addition, as a second type network centric the layers may be segregated such as network service, protocol and platform layers. It is noted that as a rule of thumb, most components in the network centric may be owned by the network provider and components in the user centric layers may be owned by the service or content providers. In addition, the adaptation layer may contain components that mediate, transform and facilitate operations between the user and the network centric layers. It is to be observed that one of the key terminologies that may be used in the model description is that of a design concept (DC). In addition, this is an abstraction to describe the feature/service/enhancement that may be the subject of evaluation using the model.

In one embodiment, the user experience layer 216 may be the outmost layer of the model and the components in this layer 216 concern themselves with the experimental changes that a user may obtain with a specific design concept. Furthermore, components in this layer 216 may be required to describe in technology and network agnostic terms and may typically describe the emotional needs that may be satisfied or being attempted to be satisfied.

By way of examples, components that fit into this layer 216 may be security, social interaction and control. Any of these may be utilized and expanded to enable further clarity. In addition, wireless buddy finder application may be sought to be deployed to address the primary need of users to increase "interaction vocally with friends". Hence from a business case perspective, what need to be evaluated in this layer may be things such as "how much would a person pay for this component". In this case, the users also have security needs and may be giving his location available online that may give him an experience of "lack of privacy". The said component may also require needs to be an input for the evaluation of the design module.

In another embodiment, the components of the user service layer 214 may describe specific user services that may be offered by the service provider. In addition, the said layer 214 may further describe the service in terms of the functionalities, limitations, as well as interactions with other services. In this case, depending on the granularity and specificity of the service, component definitions may be network agnostic or network aware.

By way of example, components in the user service layer 214 may be wireless video conferencing, push to talk. In addition, the said components as well as buddy finder application described in the previous section are examples of user service layer 214 components. In addition, components in this layer 214 may be used to offer multiple and diverse user experience components. Furthermore, push to talk application may satisfy a communication between friends experience in a retail user scenario, it may also satisfy a control over team experience in an enterprise scenario. In addition, all said needs to be inputs into an end to end evaluation.

In yet another embodiment, the adaptation layer 212 may be a transition layer between the user space and the network space. In addition the said layer 212 may be an optional layer in the evaluation of any specific design concept and may be formulated primarily as a "good to have" design practice. The said layer may consist of components that may define mapping and data transformations between network-defined services and their usage to implement user service components.

Furthermore, apart from a clean and segregated design, this allow the user service components to remain network-agnostic and potentially increasing the reach and target audience of the design concept. Furthermore, the said buddy finder application may find buddies across WLAN, GSM and possibly the regular wired internet domains, using different mediation components. In addition, introducing components in this layer 212 may also add an element of future-proofing to the user service layer components. In addition, a user service component that may provide push to talk services in a GSM network may continue offering the services even if the network migrates to UMTS.

In an embodiment, the network service layer 208 may contain components that may expose services offered by the network. These components may be network and technology aware components. Defining and evaluating these components requires a high level of technology competence and may typically involve technical architects. In addition, components in this layer may define the service, the protocols and access mechanism that can be used to access the service and the technology capabilities required from the layer below the interoperability layer 208.

By way of example, components in this layer may be internet protocol (IP) streaming, intelligent networks (IN) capabilities, mobility management. To take a specific example, the IP streaming component in this layer 208 may be used by multiple user service layer 214 components such as wireless video conferencing. The user service layer 214 components may likely use multiple network service layer 208 components specifically wireless video conferencing. In addition mobility management may also be used for the said purpose.

In another embodiment, components in the interoperability or protocol layer 206 address the aspects of implementing a specific network service with a measure of platform independence. In addition components in this layer expose application programming interfaces (APIs) or protocols for accessing platform functionality such connectivity such as sockets, messaging, XML interface, executing environment.

By way of example, components such as POSIX standard, the java virtual machine (JVM), the SNMP API may be specific examples. In all cases, the said components may allow a network service to be created in a relatively platform independent manner.

In another embodiment, components in the platform layer 204 may provide basic platform level functionality examples of which are mentioned in the earlier section as well. In addition functionalities such as memory management, fail over, hot swapping, inter-process communications may come into scope in this layer 204.

By way of example, the utility of the whole model may be seen clearly with a specific example of a new design concept in this layer. To mention specific examples, a network designer comes up with a new design concept related to high availability (HA). In addition, instead of evaluating the product on technical merits, by using the model, the designer may be forced to identify and evaluate components at all the other levels and present an overall case for the development of the design concept.

In yet another embodiment, the monitoring and control layer 202 components may tie up the management information across components in one or more layers. In addition, there may be advantages of pulling out as a separate aspect that span across the other one or more layers. Firstly, the said layer 202 enables the thought process to incorporate concepts of integrated management of the whole service offering. To be more specific, in a lot of cases, the said layer 202 also helps in clarifying and improving the design concept itself. All of the main management functionalities such as fault configuration, accounting, performance and security need to be considered while detailing aspect of the model.

As will be appreciated by a person skilled in the art, the various implementations of the present technique provide a variety of advantages. For example, the present technique may be an end to end approach to the modeling and design of network functionality. In addition, in the rapidly changing converged wireless network, this model may be significant for the below stated reasons the advantages may be summarized as below. Firstly, the chromatographic model fosters an end to end evaluation mindset and may help businesses and stakeholders in doing a detailed analysis before implementation of specific design concepts. Secondly, in a market where competition may be very high and there may be no margin for error in terms of product selections and service offerings, the model with its simple but effective methodology may yield significant business benefits. Thirdly, a detailed analysis of each of the layers for a particular design concept leads to a full architecture explanation and help in defining clearly the depth and breadth of the service offering. Fourthly, the model brings together the various stakeholders on to a common evaluation platform, and enables them to think along similar lines.

While, the following description id presented to enable a person of ordinary skill in the art to make and use the invention and is provided in the context of the requirement for a obtaining a patent. The present description is the best presently-contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest cope consistent with the principles and features described herein.

Many modifications of the present invention will be apparent to those skilled in the arts to which the present invention applies. Further, it may be desirable to use some of the features of the present invention without the corresponding use of other features.

Accordingly, the foregoing description of the present invention should be considered as merely illustrative of the principles of the present invention and not in limitation thereof.

The above-described devices and subsystems of the exemplary embodiments of FIGS. 1-2 can include, for example, any suitable servers, workstations, PCs, laptop computers, PDAs, Internet appliances, handheld devices, cellular telephones, wireless devices, other devices, and the like, capable of performing the processes of the exemplary embodiments of FIGS. 1-2. The devices and subsystems of the exemplary embodiments of FIGS. 1-2 can communicate with each other using any suitable protocol and can be implemented using one or more programmed computer systems or devices.

One or more interface mechanisms can be used with the exemplary embodiments of FIGS. 1-2, including, for example, Internet access, telecommunications in any suitable form (e.g., voice, modem, and the like), wireless communications media, and the like. For example, the employed communications networks can include one or more wireless communications networks, cellular communications networks, 3 G communications networks, Public Switched Telephone Network (PSTNs), Packet Data Networks (PDNs), the Internet, intranets, a combination thereof, and the like.

It is to be understood that the devices and subsystems of the exemplary embodiments of FIGS. 1-2 are for exemplary purposes, as many variations of the specific hardware and/or software used to implement the exemplary embodiments are possible, as will be appreciated by those skilled in the relevant art(s). For example, the functionality of one or more of the devices and subsystems of the exemplary embodiments of FIGS. 1-2 can be implemented via one or more programmed computer systems or devices.

To implement such variations as well as other variations, a single computer system can be programmed to perform the special purpose functions of one or more of the devices and subsystems of the exemplary embodiments of FIGS. 1-2. On the other hand, two or more programmed computer systems or devices can be substituted for any one of the devices and subsystems of the exemplary embodiments of FIGS. 1-2. Accordingly, principles and advantages of distributed processing, such as redundancy, replication, and the like, also can be implemented, as desired, to increase the robustness and performance the devices and subsystems of the exemplary embodiments of FIGS. 1-2.

The devices and subsystems of the exemplary embodiments of FIGS. 1-2 can store information relating to various processes described herein. This information can be stored in one or more memories, such as a hard disk, optical disk, magneto-optical disk, RAM, and the like, of the devices and subsystems of the exemplary embodiments of FIGS. 1-2. One or more databases of the devices and subsystems of the exemplary embodiments of FIGS. 1-2 can store the information used to implement the exemplary embodiments of the present invention. The databases can be organized using data structures (e.g., records, tables, arrays, fields, graphs, trees, lists, and the like) included in one or more memories or storage devices listed herein. The processes described with respect to the exemplary embodiments of FIGS. 1-2 can include appropriate data structures for storing data collected and/or generated by the processes of the devices and subsystems of the exemplary embodiments of FIGS. 1-2 in one or more databases thereof.

All or a portion of the devices and subsystems of the exemplary embodiments of FIGS. 1-2 can be conveniently implemented using one or more general purpose computer systems, microprocessors, digital signal processors, microcontrollers, and the like, programmed according to the teachings of the exemplary embodiments of the present invention, as will be appreciated by those skilled in the computer and software arts. Appropriate software can be readily prepared by programmers of ordinary skill based on the teachings of the exemplary embodiments, as will be appreciated by those skilled in the software art. In addition, the devices and subsystems of the exemplary embodiments of FIGS. 1-2 can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware circuitry and/or software.

Stored on any one or on a combination of computer readable media, the exemplary embodiments of the present invention can include software for controlling the devices and subsystems of the exemplary embodiments of FIGS. 1-2, for driving the devices and subsystems of the exemplary embodiments of FIGS. 1-2, for enabling the devices and subsystems of the exemplary embodiments of FIGS. 1-2 to interact with a human user, and the like. Such software can include, but is not limited to, device drivers, firmware, operating systems, development tools, applications software, and the like. Such computer readable media further can include the computer program product of an embodiment of the present invention for performing all or a portion (if processing is distributed) of the processing performed in implementing the exemplary embodiments of FIGS. 1-2. Computer code devices of the exemplary embodiments of the present invention can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the exemplary embodiments of the present invention can be distributed for better performance, reliability, cost, and the like.

As stated above, the devices and subsystems of the exemplary embodiments of FIGS. 1-2 can include computer readable medium or memories for holding instructions programmed according to the teachings of the present invention and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave, or any other suitable medium from which a computer can read.

While the present invention have been described in connection with a number of exemplary embodiments and implementations, the present invention is not so limited, but rather covers various modifications and equivalent arrangements, which fall within the purview of the appended claims.

What we claim is:

1. A method for evaluating a business case for a proposed design module in an existing chromatographic network model having network functionality, the method comprising:
   receiving a proposed design model input by a user input via a computer interface, wherein the proposed design model is to provide one or more new network-based services in an existing chromatographic network model having a plurality of network layers;
   identifying, from the user input via the computer interface, a current network layer in the existing chromatographic network model where the proposed design model is to be implemented, wherein a first entity controls the current network layer;
   receiving, from the user input via the computer interface, one or more first potential benefit attributes and one or more first potential cost attributes which affect the existing chromatographic network model as a result of implementing the proposed design model in the current network layer;
   storing the one or more first proposed benefit attributes and the one or more first proposed cost attributes in a computer memory;
   identifying, from the user input via the computer interface, at least one in a set of preceding network layers and at least one in a set of succeeding network layers with respect to the current network layer, wherein the at least one of the preceding network layers is controlled by a second entity separate from the first entity and wherein the at least one of the succeeding network layers is controlled by a third entity separate from the first entity;
   assigning, using one or more processors, one or more second potential benefit attributes and one or more second potential cost attributes which correspondingly affect the at least one identified preceding network layer or the at least one identified succeeding network layer as a result of implementing the proposed design model in the current network layer;
   storing the one or more second potential benefit attributes and the one or more second potential cost attributes in the computer memory; and
   evaluating, using one or more processors, the stored first and second proposed benefit attributes and the stored first and second potential cost to determine an end to end business case for accepting or rejecting implementation of the proposed design model in one or more network layers of the existing chromatographic model.

2. The method as recited in claim 1, further comprising extracting a first set of inputs associated with the one or more second potential benefit attributes related to one or more components to be implemented in the at least one preceding network layer in response to implementing the proposed design model in the current network layer.

3. A non-transitory computer-readable medium having stored thereon computer executable instructions for causing a machine to evaluate a business case for a proposed design model in an existing chromatographic network model, the computer-readable medium comprising program code which causes the machine to:
   receive a proposed design module input by a user via a computer interface, wherein the proposed design model is to provide one or more new network-based services in an existing chromatographic network model having a plurality of layers;
   identify a current network layer in the existing chromatographic model where the proposed design model is to be implemented, wherein a first entity controls the current network layer;
   receive one or more first potential benefit attributes and one or more first potential cost attributes which affect the existing chromatographic network model as a result of implementing the proposed design model in the current network layer;
   store the one or more first proposed benefit attributes and the one or more first proposed cost attributes in a computer memory;
   identify at least one in a set of preceding network layers and at least one in a set of succeeding network layers with respect to the current network layer, wherein the at least one of the preceding network layers is controlled by a second entity separate from the first entity and wherein the at least one of the succeeding network layers is controlled by a third entity separate from the first entity;
   assign one or more second potential benefit attributes and one or more second potential cost attributes which correspondingly affect the at least one preceding network layer or the at least one succeeding network layer as a result of implementing the proposed design model in the current network layer;
   store the one or more second potential benefit attributes and the one or more second potential cost attributes in the computer memory; and
   evaluate the stored first and second proposed benefit attributes and the stored first and second potential cost values to determine an end to end business case for accepting or rejecting the proposed design model in one or more network layers of the existing chromatographic network model.

4. The computer-readable medium as recited in claim 3, wherein the machine is configured to extract a first set of inputs and a second set of inputs for defining the set of components in the current layer or the set of preceding layers or the set of succeeding layers or combinations thereof to evaluate the end to end business case for the proposed design module.

5. The computer-readable medium as recited in claim 3, wherein the machine is configured to define a plurality of services associated with the proposed design module by analyzing the current layer or the set of preceding layers or the set of succeeding layers or combinations thereof.

6. The computer-readable medium as recited in claim 3, wherein the machine implements a set of use cases for designing the design module.

7. The method as recited in claim 1, further comprising extracting a second set of inputs associated with the one or more second potential benefit costs relating to one or more components to be implemented in the at least one succeeding network layer in implementing the proposed design model in the current network layer.

8. The method as recited in claim 1, wherein at least a portion of the existing chromatographic network is a wireless network configured to allow communications with a mobile device.

9. The method as recited in claim 1, wherein at least one of the one or more network-based services of the proposed design model is associated with a network platform enhancement.

10. The method as recited in claim 1, wherein at least one of the one or more network-based services of the proposed design model is associated with a service directly provided to a mobile device user via the user's mobile device.

11. A computer system for evaluating a business case for a proposed design model in an existing chromatographic network model, the computer system comprising:

one or more processors configured to generate a computer user interface for receiving an input from a user regarding a proposed design model, wherein the proposed design model is to provide one or more new network-based services in a current network layer of an existing chromatographic network model having a plurality of network layers, wherein the current network layer is controlled by a first entity, the computer user interface configured to receive from the user one or more potential benefit attributes and one or more potential cost attributes which affects at least one preceding network layer or at least one succeeding network layer as a result of implementing the proposed design model in the current network layer, wherein the at least one preceding network layer and the at least one succeeding network layer is controlled at least by a second entity separate from the first entity;

a computer memory configured to store the one or more proposed benefit attributes and the one or more proposed cost attributes, wherein the one or more processors evaluates stored proposed benefit attributes and the stored potential cost values to determine an end to end business case for accepting or rejecting implementation of the proposed design model in the existing chromatographic network model.

12. The computer system as recited in claim 11, wherein the current network layer is a user experience network layer in which the proposed design model is to be implemented.

13. The computer system as recited in claim 11, wherein at least one succeeding network layer is a network service layer configured to implement platform independent protocol-based communications, wherein the network service layer is controlled by the second entity separate from the first entity controlling the user experience network layer.

14. The computer system as recited in claim 11, wherein at least one succeeding network layer is a monitoring and control layer adapted to allow communications between all of the network layers in the existing chromatographic network model.

* * * * *